United States Patent
Hartmann

(10) Patent No.: US 11,802,634 B2
(45) Date of Patent: Oct. 31, 2023

(54) METHOD OF DIAGNOSING A VALVE, DIAGNOSIS MODULE, AND VALVE

(71) Applicant: Buerkert Werke Gmbh & Co. KG, Ingelfingen (DE)

(72) Inventor: Christian Hartmann, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 17/386,340

(22) Filed: Jul. 27, 2021

(65) Prior Publication Data
US 2022/0034424 A1  Feb. 3, 2022

(30) Foreign Application Priority Data
Jul. 28, 2020 (DE) .................... 10 2020 119 898.1

(51) Int. Cl.
*F16K 37/00* (2006.01)
*F16K 99/00* (2006.01)
*G06N 20/00* (2019.01)

(52) U.S. Cl.
CPC ...... *F16K 37/0083* (2013.01); *F16K 99/0015* (2013.01); *F16K 99/0046* (2013.01); *G06N 20/00* (2019.01)

(58) Field of Classification Search
CPC ............. F16K 37/0083; F16K 99/0015; F16K 99/0046; G06N 20/00
See application file for complete search history.

(56) References Cited

U.S. PATENT DOCUMENTS

| | | | |
|---|---|---|---|
| 6,249,418 B1 | 6/2001 | Bergstrom | |
| 9,856,993 B2 | 1/2018 | Fuchs et al. | |
| 10,396,646 B2 * | 8/2019 | Reiter | H02K 41/0356 |
| 2011/0094589 A1 * | 4/2011 | Jacob | H01F 7/1805 137/1 |
| 2015/0069860 A1 | 3/2015 | Reiter et al. | |

(Continued)

FOREIGN PATENT DOCUMENTS

| | | | |
|---|---|---|---|
| DE | 4013393 A1 * | 10/1991 | G01R 31/72 |
| DE | 60024232 T2 | 8/2006 | |

(Continued)

OTHER PUBLICATIONS

Rahman et al. "A Sensorless Position Estimator for a Nonlinear Solenoid Actuator", Proceedings of IECON '95—21st Annual Conference on IEEE Industrial Electronics. pp. 1208-1213.

(Continued)

*Primary Examiner* — Angelisa L. Hicks
(74) *Attorney, Agent, or Firm* — DILWORTH IP, LLC

(57) ABSTRACT

A method of diagnosing a valve is described, which has an electrodynamic actuator, which includes a magnet arrangement for generating a magnetic field and a control element which is movable relative to the magnet arrangement and is coupled to a movably arranged coil. At least one electrical variable of the electrodynamic actuator is measured over a measurement period to detect a time course of the electrical variable. The time course of the electrical variable is evaluated over an evaluation period to determine at least one induction-dependent valve variable which is assigned to the motion profile of the electrodynamic actuator. A diagnosis module and a valve are furthermore described.

14 Claims, 6 Drawing Sheets

(56) References Cited

U.S. PATENT DOCUMENTS

2016/0153577 A1   6/2016  Fuchs et al.
2016/0291075 A1  10/2016  Sommansson

FOREIGN PATENT DOCUMENTS

| DE | 102009054400 A1 | 8/2011 | |
|----|-----------------|--------|---|
| DE | 102014117656 A1 | 6/2016 | |
| DE | 102013110029 C5 | 3/2017 | |
| DE | 102018114094 B3 | 5/2019 | |
| FR | 3007855 A1 * | 1/2015 | ......... G05D 16/2013 |
| WO | 2007081308 A2 | 7/2007 | |
| WO | 2015077673 A1 | 5/2015 | |

OTHER PUBLICATIONS

Shewale et al. "Design and Implementation of Position Estimator Algorithm on Voice Coil Motor", 2018 3rd International Conference for Convergence in Technology. pp. 1-5.

Tod et al. "A convolutional neural network aided physical model improvement for AC solenoid valves diagnosis", 2019 Prognostics and System Health Management Conference (PHM-Paris). pp. 223-227.

Tongjun Guo et al. "The Research on the Motion State Monitoring of Electromagnetic Valve Train of Engine Based on Internet of Things", IEEE Access, Special Section on Data Mining for Internet of Things. pp. 89458-89465, 2019.

\* cited by examiner

METHOD OF DIAGNOSING A VALVE, DIAGNOSIS MODULE, AND VALVE

FIELD OF THE DISCLOSURE

Embodiments of the present disclosure relate to a method of diagnosing a valve having an electrodynamic actuator. Further embodiments of the present disclosure relate to a diagnosis module for a valve having an electrodynamic actuator, and to a valve.

BACKGROUND

In fluid technology, valves which have an electrodynamic actuator are typically used. In known electromagnetic actuators, an armature made of a magnetic material is moved by a magnetic field generated by a coil, which changes the position of the valve. Particularly in case of a miniaturization of the valves, the possibilities of designing so as to save space, on the one hand, and of providing sufficient magnetic force, on the other hand, are limited. This is due to the fact that in case of a small coil, the magnetic field intensity which can be achieved decreases considerably or the maximum possible current is correspondingly limited.

In contrast to the known electromagnetic actuators, the magnetic field intensity in electrodynamic actuators depends on the volume of the permanent magnets of the magnet arrangement used in the actuator. A reduction of the volume of the permanent magnets of the magnet arrangement has a comparatively smaller effect on the available magnetic field intensity than the reduction of the coil size in an electromagnetic actuator. Therefore, with electrodynamic actuators, correspondingly high magnetic forces can be generated even with small space sizes or miniaturizations of the valves. Such an electrodynamic actuator is known, for example, from DE 10 2013 110 029 C5.

The electrodynamic actuators are typically used in valves in which little space is available. In this respect, it is not possible in these valves, either, to provide a sensor system via which the state of the valve can be monitored or appropriate diagnostic functions of the valve can be carried out. The sensors known from the prior art can in particular not be used for the determination of the stroke in valves having an electrodynamic actuator, as the electrodynamic actuator has a relatively small stroke, which cannot be detected in a reliable manner by the sensors known from the prior art.

SUMMARY

The object is to provide a diagnosis in a simple and cost-effective manner for a valve having an electrodynamic actuator.

According to the present disclosure, the object is achieved by a method of diagnosing a valve having an electrodynamic actuator, which comprises a magnet arrangement for generating a magnetic field and a control element which is movable relative to the magnet arrangement and coupled to a movably arranged coil. The method comprises the following steps:
  measuring at least one electrical variable of the electrodynamic actuator over a measurement period to detect a time course of the electrical variable, and
  evaluating the time course of the electrical variable over an evaluation period to determine at least one induction-dependent valve variable which is assigned to the motion profile of the electrodynamic actuator.

The basic idea is to provide a diagnostic function for the valve by focusing on the at least one electrical variable of the electrodynamic actuator, i.e., the current and/or voltage used during operation of the electrodynamic actuator. The current flowing through the electrodynamic actuator, in particular the coil, or the voltage applied to the electrodynamic actuator, in particular the coil, is thus measured over time to sense the corresponding time course over the measurement period. This time course is then evaluated to thus determine a diagnosis of the valve, for example to define a condition of the valve.

According to the main idea, a direct evaluation of the time response of the electrical variable is thus provided, as a result of which the at least one induction-dependent valve variable of the valve is determined, which is influenced by the movement of the electrodynamic actuator. Basically, the induction depends on the length of the coil in the magnetic field generated by the magnet arrangement, the speed of the movement of the coil moving in the magnetic field, and the magnetic flux density. The coil constitutes an electrical conductor which moves in the magnetic field when the electrodynamic actuator is driven, in particular perpendicularly to the magnetic field direction. In other words, the at least one induction-dependent valve variable assigned to the motion profile of the electrodynamic actuator can be determined by evaluating the time course.

Accordingly, it is not necessary to use external sensors, for example displacement sensors, by means of which the movement of the actuator is detected, as is typically the case with electromagnetic actuators, which are also referred to as reluctance-based actuators. According to the present disclosure, it is not necessary, either, for a specially modulated signal to be used and evaluated to thus perform a diagnosis of the valve. Rather, according to the present disclosure, a valve variable assigned to the motion profile of the electrodynamic actuator can be determined via the corresponding time response of the measurable electrical variable.

By evaluating the time course of the at least one electrical variable, it is possible to derive the at least one valve variable, which contains information relevant for diagnoses. In contrast thereto, the sensors used with the electromagnetic actuators often only make it possible to determine whether a voltage intended for switching is present, but not whether the magnet armature has actually moved. If the magnet armature does not move, for example because it is tilted or stuck or the valve is clogged due to deposits, the valve will not switch with the electromagnetic actuator. Until now, this was not detected directly via the valve, but via an additional sensor system, for example an additional flow sensor.

According to the present disclosure, such states or diagnoses can be determined directly in the valve by evaluating the time course of the electrical variable of the electrodynamic actuator.

Accordingly, the corresponding evaluation is performed based on the measurement of the time response of the electrical variable (current and/or voltage) occurring when the valve is switched, which is measured accordingly over the measurement period.

One aspect provides that the electrical variable of the electrodynamic actuator is measured by means of a diagnosis module electrically inserted in an electric circuit of the coil of the electrodynamic actuator. The diagnosis module can therefore measure the current and/or voltage flowing through or applied to the electrodynamic actuator as the diagnosis module is inserted in the electric circuit.

The at least one valve variable may be a path traveled by the coil, the duration of movement of the coil, a speed profile of the coil, and/or an acceleration profile of the coil. In this respect, based on the time course of the at least one electrical variable measured over the measurement period, corresponding motion parameters of the electrodynamic actuator can be determined, since these have an influence on the induction, which is accordingly measured electrically. In contrast thereto, in the case of reluctance actuators, no conclusions can be drawn about the path traveled or the speed of movement of the reluctance actuator.

According to a further aspect, when evaluating the time course of the electrical variable, a time reference course of the electrical variable is used as a reference, wherein the time course is compared with the time reference course, in particular wherein a difference is formed between the time course and the time reference course. The time reference course is thus used to determine corresponding deviations in the operation of the valve, in particular of the electrodynamic actuator. This allows the valve variable to be determined unambiguously if the time course exhibits a characteristic deviation from the reference course.

The influence of the induction can be determined when the difference between the reference course and the measured course is formed, as a result of which the motion profile can be concluded accordingly. For this purpose, the reference course is selected such that there is no induction, i.e., no movement of the coil in the magnetic field. In other words, the reference course corresponds to a blocked or stuck coil.

Therefore, if there is no difference between the measured course and the reference course, this would indicate a stuck or blocked coil.

In particular, the time course and the time reference course together enclose a surface, the surface area and/or shape of which is determined or analyzed. The time course of the electrical variable, for example the current curve (over time), represents a measure of the speed of the electrodynamic actuator, in particular of the moving coil, so that the integration over the time course corresponds to the path traveled by the coil. In other words, the surface area thus represents the traveled path of the coil. To determine the acceleration of the coil, the measured time course of the electrical variable must be derived according to time. It is thus possible to determine the induction-dependent valve variable assigned to the motion profile of the electrodynamic actuator, in particular of the coil.

It is basically possible to evaluate the shape of the time course, i.e., independently of the time reference course, to determine the at least one valve variable. Based on the shape, it is possible to infer, for example, a switching duration of the electrodynamic actuator, i.e., the duration of the movement of the coil. The speed profile of the coil can also be determined directly from the shape of the time course.

Furthermore, the time reference course can be a previously measured time course, a course calculated during the process, or an approximately estimated course. The previously measured time course corresponds to a previously recorded time course of the electrical variable, for example a previously recorded current course, which has been recorded under substantially similar ambient parameters, so that an influence of the ambient parameters is negligible.

It may also be provided that, when measuring the electrical variable, a corresponding calculation is performed by means of which the reference curve is determined, which is related to the measured time course. A corresponding approximation can be carried out on the basis of the determined measurement data, so that the time reference course is an approximately estimated course.

For the approximation used as a reference course, a rectangular course can be assumed, so that the reference course corresponds to a rectangle.

Basically, the time course of the electrical variable can first be evaluated mathematically to thus determine the at least one valve variable during the evaluation. For example, a mean final value of the measured electrical variable is first determined, which is then subtracted from the respective measured values of the electrical variable to obtain a modified time course of the electrical variable. The mean end value is a value of the measured electrical variable which no longer changes or only changes in a specific interval over a predefined time, so that it is assumed to be constant over the predefined time. Thus, at the mean final value, an end of the switching process or of the movement of the electrodynamic actuator is assumed. Subsequently, the values of the modified time course of the electrical variable can be divided by the mean final value, as a result of which the values thus obtained are independent of a resistance.

Finally, a surface below the corresponding curve can be determined, wherein the integral is both independent of time and independent of resistance.

The correspondingly determined surface may also be compared with a threshold value to determine whether the valve has actually switched or not. Thus, the state of the valve can be determined accordingly.

The electrical variable can also be measured over a measurement period, the measured values being added up. A corresponding cumulative value is thus continuously calculated and temporarily stored in a memory, in particular in a ring buffer. The data stored in the ring buffer can be used to estimate the mean final value, for example as a moving average. The mean final value can thus still be determined, in particular estimated, during the measurement of the electrical variable.

Subsequently, a calculation of the surface below the corresponding curve can be performed as previously described, the determined surface being in turn compared with the threshold value to determine the position of the valve.

A further aspect provides that the determined valve variable is evaluated to determine at least one valve parameter of the valve. The valve parameter may be a coil temperature, a valve temperature, a pressure ratio in the valve, a state of a diaphragm actuated by the electrodynamic actuator, the type of diaphragm, a lifetime prediction of the diaphragm, a press-in depth of the diaphragm into an associated valve seat, and/or a correct fitting position of the diaphragm. In this way, it can also be determined whether external disturbances such as pressure surges or cavitation are present, or whether there is friction in the driving system. Therefore, the previously determined valve variable is further evaluated to be able to provide at least one diagnostic function of the valve. Here, additional parameters can be used, for example the valve type, to determine, among other things, whether a media pressure presses the diaphragm of the valve onto the valve seat or lifts it off the valve seat. In other words, the valve type has an influence on whether the media pressure assists or inhibits the lifting of the diaphragm from the valve seat. Ambient parameters, such as an ambient temperature can also be taken into account.

The lifetime of the diaphragm can be predicted by comparing it with the reference course, since deviations from the reference course provide information about the state of the diaphragm, which can be used to make a lifetime prediction.

Measurements taken when the valve is switched off can basically be used to determine the press-in depth of the diaphragm into the valve seat. It is thus possible to infer the wear at this point, so that the beginning of the so-called "punching through" of the diaphragm may possibly be detected.

Artificial intelligence, in particular a machine learning model can be used in the evaluation to determine the at least one valve parameter of the valve. In principle, the artificial intelligence may be an algorithm executed by a processor or a control and/or evaluation unit to determine the at least one valve parameter.

In particular, a machine learning module is provided which has a trained or taught machine learning model which receives the previously determined valve variable as an input parameter or is fed with the previously determined valve variable to determine the at least one valve parameter.

According to the present disclosure, the object is furthermore achieved by a diagnosis module for a valve having an electrodynamic actuator comprising a magnet arrangement for generating a magnetic field and a control element which is movable relative to the magnet arrangement and coupled to a movably arranged coil. The diagnosis module is set up to perform a method of the type previously mentioned.

The diagnosis module may be a retrofit assembly into which the corresponding valve is subsequently coupled to provide the diagnostic function(s). The diagnosis module may be electrically connected into the electric circuit of the coil to sense the at least one electrical variable of the electrodynamic actuator.

According to the present disclosure, the object is furthermore achieved by a valve comprising a diaphragm, an electrodynamic actuator coupled to the diaphragm, and a diagnosis module of the type mentioned above. The electrodynamic actuator may comprise a magnet arrangement for generating a magnetic field and a control element which is movable relative to the magnet arrangement and coupled to a movably arranged coil.

The valve is a microvalve. The microvalve has a correspondingly compact design.

In principle, the valve can initially be designed without a diagnosis module, the diagnosis module being subsequently integrated as an optional retrofit module.

Diagnosis by means of the diagnosis module works for all valve types having an electrodynamic actuator.

The method and the diagnosis module thus provide an extension to enable corresponding diagnostic functions for a valve having an electrodynamic actuator.

In principle, the above-mentioned features and the associated advantages can be applied accordingly to the method, the diagnosis module and the valve.

BRIEF DESCRIPTION OF THE DRAWINGS

Further advantages and characteristic features of the claimed subject matter will become apparent from the description below and the drawings, to which reference is made and in which:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
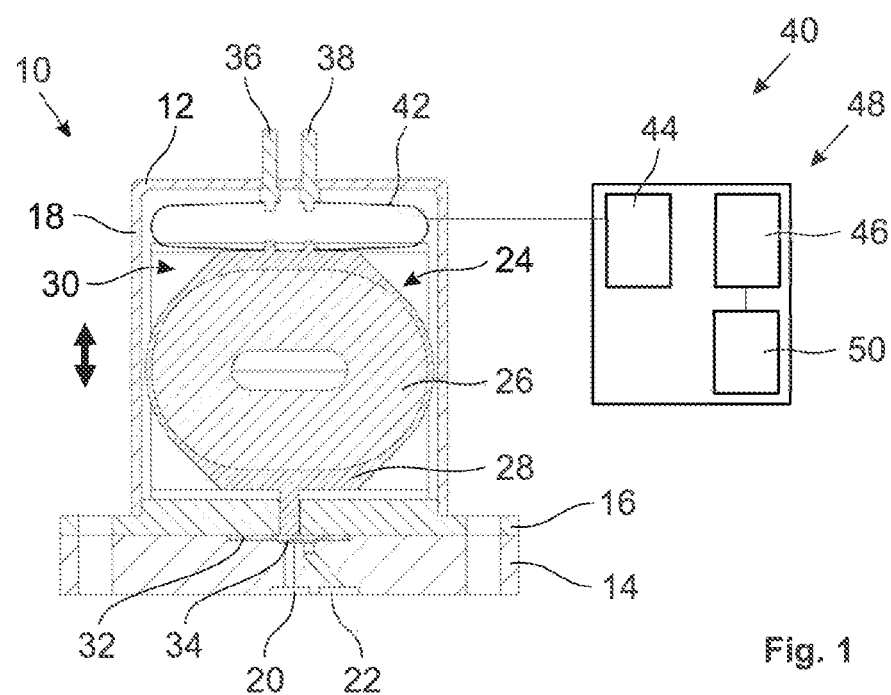
FIG. 1 shows a schematic representation of a valve according to the present disclosure with a diagnosis module according to the present disclosure.

FIG. 1 shows a valve 10 which has a housing 12 composed, for example, of a plurality of housing parts 14, 16, 18.

Two fluid connections 20, 22 are formed on the housing 12, in particular the first housing part 14, via which a fluid can flow through the valve 10 and is accordingly processed by the valve 10.

To control the fluid to be processed, an electrodynamic actuator 24 is provided comprising a coil 26 configured as an air coil and a control element 28 coupled to the coil 26. In addition, the electrodynamic actuator 24 has a magnet arrangement 30, which is shown only schematically in FIG. 1.

The magnet arrangement 30 generates a magnetic field in which the coil 26 is movably arranged, so that the coil 26 moves within the magnetic field generated by the magnet arrangement 30, provided that the coil 26 is energized, i.e., a current is applied thereto. The movement of the coil 26 is transmitted to the movable control element 28 to adjust a diaphragm 32 coupled to the control element 28, which allows the fluid flow across the fluid connections 20, 22 to be adjusted.

To this end, the diaphragm 32 cooperates with a valve seat 34 of the valve 10, which is formed in the housing 12, in particular in the first housing part 14.

In the embodiment of the valve 10 shown, the diaphragm 32 is arranged between the first housing part 14 and the second housing part 16, for example clamped between the two housing parts 14, 16.

The second housing part 16 together with the third housing part 18 receives the electrodynamic actuator 24, so that these two housing parts 16, 18 together form the actuator housing.

In addition, the valve 10 includes electrical connections 36, 38 via which the electrodynamic actuator 24 is supplied with a voltage to initiate the corresponding movement of the control element 28 or the diaphragm 32 connected thereto in that a current flows through the coil 26. The connections 36, 38 are also provided on the housing 12, namely on the third housing part 18.

In the embodiment shown in FIG. 1, the valve 10 includes a diagnosis module 40 which is connected into an electric circuit 42 of the coil 26 or of the electrodynamic actuator 24.

The diagnosis module 40 is basically configured to measure an electrical variable of the electrodynamic actuator 24. The electrical variable may be a current and/or a voltage, so that the time course of the corresponding electrical variable can be measured over a measurement period to record the time course of the electrical variable, for example a current course or a current curve.

To this end, the diagnosis module 40 includes a measurement module 44 which measures the corresponding electrical variable of the electrodynamic actuator 24.

The measured electrical variable can be transmitted from the measurement module 44 to a computing module 46 of the diagnosis module 40, which performs a corresponding calculation based on the measured electrical variable, so as to perform an evaluation of the time course of the electrical variable.

The computing module 46 may be part of a higher-level control and/or evaluation unit 48, in particular of the entire valve 10, provided that the diagnosis module 40 is integrated in the valve 10.

However, in the embodiment shown, the diagnosis module 40 is designed separately, since it is a retrofit module which was subsequently integrated into the existing electric circuit 42 to add the appropriate diagnostic functionality to the valve 10.

In the embodiment shown, the diagnosis module 40 also comprises an output module 50 via which the measured electrical variable and/or a variable determined based thereon can be output so that they can be displayed to a user of the valve 10. The output module 50 may be a display.

In principle, the diagnosis module 40 thus serves to detect and evaluate a state of the valve 10 or of the electrodynamic actuator 24 to determine a diagnostic function. As already explained, the diagnosis module 40 focusses on a correspondingly measured electrical variable of the electrodynamic actuator 24, for example the current.

Figure 2:
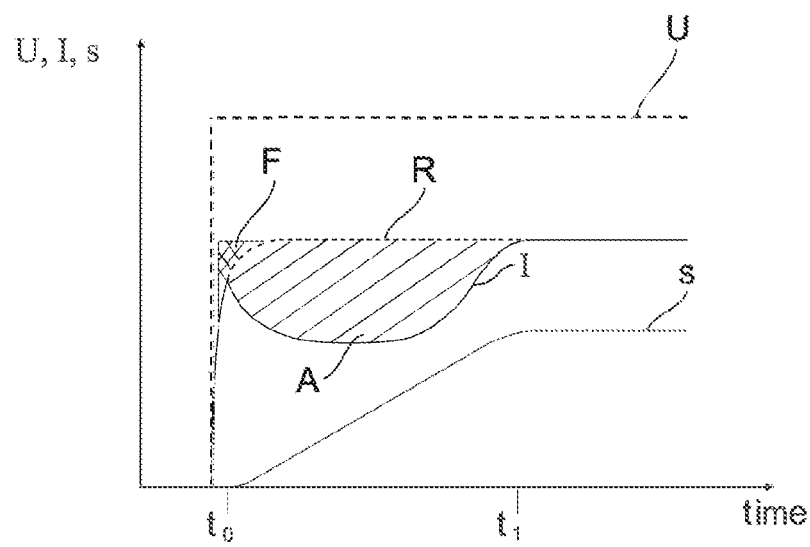
FIG. 2 shows a diagram showing a time course of a measured electrical variable and a time reference course.

FIG. 2 shows a diagram showing the electrical variables measured by the diagnosis module 40 over a measurement period, the corresponding time course of the electrical variables being represented.

The measured electrical variables are the voltage U applied to the electrodynamic actuator 24 and the current I flowing through the electrodynamic actuator 24, in particular the coil 26. The voltage U is shown as a dashed line, whereas the current I is shown as a solid line in the diagram.

Furthermore, FIG. 2 shows a time reference course R, which is also shown as a dashed line. The time reference course R represents a reference for the current course that would occur with a blocked or stuck coil 26, i.e., with no movement of the coil 26.

It is apparent from FIG. 2 that the time course of the current I deviates from the time reference course R in a time period which lies between t0 and t1, which corresponds to an evaluation period.

The current course, i.e., the time course of the electrical variable of the current I, therefore collapses at time t0 relative to the reference course R, with the current course reaching its final value at time t1, which corresponds to that of the time reference course R.

The dip in the measured current course I is accompanied by a movement of the electrodynamic actuator 24, as is also apparent from FIG. 2, in that the path s of the coil 26 over time is additionally represented.

In this respect, the measured current at time t1 again corresponds to the current value of the reference course R, since the movement of the coil 26 has ended at this time.

Basically, the shape of the dip, i.e., the deviation of the measured time course of the electrical variable (current course) from the time reference course R, depends on the speed of the coil 26, so that when the time course of the current I is evaluated over the evaluation period, at least one induction-dependent valve variable of the valve 10 can be determined, which is assigned to the motion profile of the electrodynamic actuator 24.

As explained above, the induction-dependent valve variable may be the travelled path s of the coil 26. It may also be the duration of the movement of the coil 26, a speed profile of the coil 26, and/or an acceleration profile of the coil 26. For this purpose, the shape of the current course is analyzed accordingly during the evaluation to conclude the duration of the movement, the speed profile and/or the acceleration profile of the coil 26.

The reference course R, with which the measured time course of the electrical variable I is compared, may be a previously measured time course, for example with a blocked coil 26, or a course calculated during the process.

A correspondingly approximated course may also be used as an approximation, as is also shown in FIG. 2, in that a rectangular course or a corresponding rectangle having a cross-hatched surface F as an error is assumed approximately.

Irrespective of the nature of the reference course, i.e., how it takes, the difference between the time course of the electrical variable, i.e., the current course I, and the time reference course R can be used to determine how and whether the coil 26 of the electrodynamic actuator 24 has moved upon actuation of the electrodynamic actuator 24. In other words, it is possible to determine the motion profile of the electrodynamic actuator 24.

To this end, the surface A enclosed between the time course of the electrical variable I and the reference course R can be taken into account, the surface being determined and/or the shape of the enclosed surface being analyzed, as already explained above, to infer the valve variable.

This can be done accordingly in the diagnosis module 40, in particular in the integrated computing module 46.

The coil 26 moved in the magnetic field generated by the magnet arrangement 30 basically represents a current-carrying conductor moved in the magnetic field.

As the length of the electrical conductor in the magnetic field, the speed of the movement of the coil 26 and the magnetic flux density have an influence on the induction, this can be detected accordingly by the diagnosis module 40, wherein the diagnosis module 40 evaluates the time course of the electrical variable of the electrodynamic actuator 24, for example the current course.

The measured current curve, i.e., the time course of the electrical variable provided as current, can then be subtracted from a current curve without movement, i.e., with a blocked coil 26, the latter corresponding to the reference course R. Only the fraction caused by the induction remains.

This fraction caused by the induction has the surface area of the surface A, as shown in FIG. 2, the size of the surface A and the shape of the surface A being adapted to be analyzed to thus determine the induction-dependent valve variable assigned to the motion profile of the electrodynamic actuator 24, in particular the coil 26.

The surface area of the surface A corresponds to the path s travelled by the coil 26, which in turn can be used to infer a valve stroke of the valve 10 with the electrodynamic actuator 24.

For this purpose, a corresponding normalization must take place to assign the path s of the coil 26 to the valve stroke of the valve 10. This can be done by means of a corresponding normalization. To assign the path s of the coil 26 to the stroke of the valve 10, the measured electrical variable of the electrodynamic actuator 24 is normalized to the valve 10.

For this purpose, the respectively determined final value can be used for normalization, or the maximum stroke in relation to the (maximum) surface A can be stored for each valve 10. For example, the maximum stroke is specified as a travel, i.e., in "mm", or as a degree of opening, i.e., in "%". It is also possible to define a limit or threshold value above which the valve 10 is considered "open". In addition to the normalization to the maximum stroke of the valve 10, the geometry of the entire valve drive is also taken into account.

Figure 3:
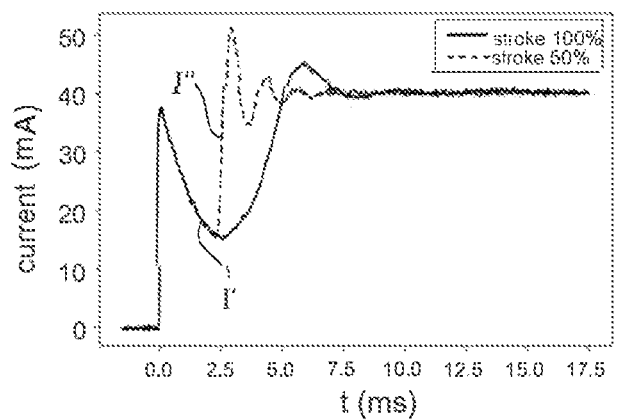
FIG. 3 shows a diagram showing two different time courses of a measured electrical variable for different motion profiles of the electrodynamic actuator.

FIG. 3 shows that the time course of the electrical variable, i.e., the current curve, can also be evaluated independently of the reference course R to draw conclusions about a corresponding valve variable.

FIG. 3 in particular shows a diagram showing two time courses I', I" of the electrical variable provided as a current for a fully open valve 10 (100%) and a half-open valve 10 (50%), based on the stroke of the valve 10.

FIG. 3 clearly shows that the two time courses of the measured electrical variable differ from each other, as a result of which the degree of opening of the valve 10 can be concluded accordingly.

In this respect, the corresponding profile, i.e., the speed and the time, can be used to draw conclusions about the force equilibrium prevailing at the valve 10 at the respective time.

As explained above, a rectangle can be assumed approximately as the reference course to determine a surface which indicates the induction-related fraction. This can be used to determine the path s of the coil 26, from which the stroke can be deduced, as described above.

Figure 4:
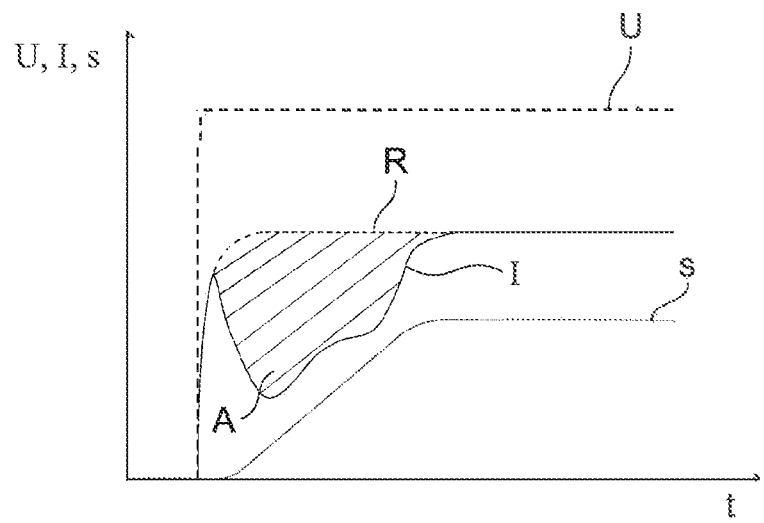
FIG. 4 shows a diagram showing the time course of a measured electrical variable and a time reference course for a valve according to one embodiment.
Figure 5:
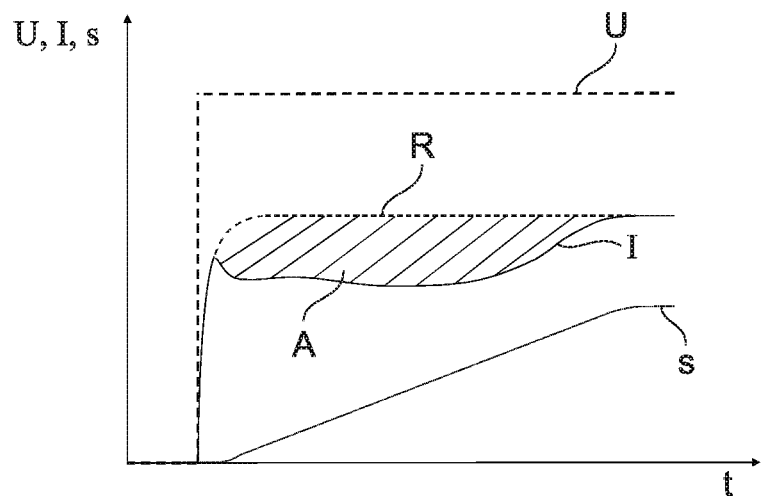
FIG. 5 shows a diagram showing the time course of a measured electrical variable and a time reference course for a valve according to another embodiment.

FIGS. 4 and 5 show two further diagrams for corresponding time courses of the electrical variable provided as current, i.e., the current curves I, which differ from each another. Also shown in both diagrams are the voltage U, the path s of the coil 26, the time reference course R, and the surface A.

The embodiment shown in FIG. 4 involves a valve 10, the valve seat 34 of which is impinged by a flow from below, which is also referred to as "bottom-seat impingement". In this case, a medium pressure is exerted on the diaphragm 32, which is why the pressure of the medium supports the opening movement when the valve 10 opens, as can be seen from the shape of the time course of the measured electrical variable.

In contrast thereto, FIG. 5 shows that the diaphragm 32 is impinged by a flow from above, which is also referred to as "top-seat impingement", which makes it more difficult to open the diaphragm 32, as it must be moved against the pressure of the medium when opening, which correspondingly increases the switching time.

This can be clearly seen from a comparison of the time courses shown in FIGS. 4 and 5, in particular their shapes, which are evaluated accordingly by the diagnosis module 40.

In FIG. 4, the "dip" in the current course I at the beginning of the movement can be clearly seen, in particular more strongly than in the current course I in FIG. 5. In contrast thereto, the coil 26 in the example according to FIG. 5 moves much more slowly, which increases the switching time, as the diaphragm 32 must work against the medium pressure.

The surface areas of the surfaces A enclosed by the respective current course I and the reference course R are equal in size, since the valve 10 or the electrodynamic actuator 24 is completely moved. However, the surfaces A differ in shape, as can be seen from FIGS. 4 and 5.

The different shape results from different current courses I. The current course is influenced, among other things, by pressure, direction of flow, temperature (medium, environment, valve) and viscosity of the medium and membrane material or state of the membrane. In this respect, these variables can be derived as valve variables from the current course I or determined during evaluation.

Figure 6:
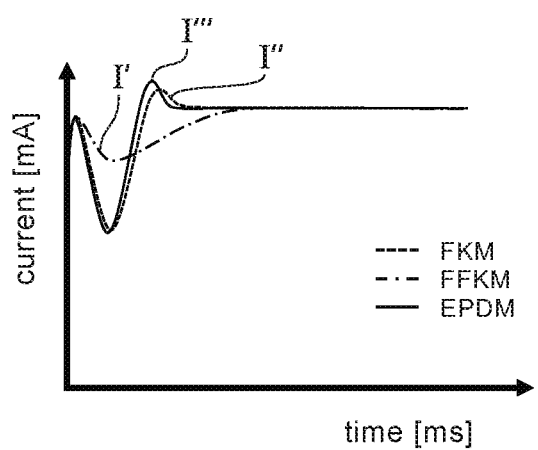
FIG. 6 shows a diagram showing the time courses of a measured electrical variable for three different diaphragm materials.

FIG. 6 shows three different time current courses I', I", I'", which have been measured for three different materials of the membrane 32, namely for a fluoro-rubber (FKM), a perfluoro-rubber (FFKM) and an ethylene-propylene-diene (monomer) rubber (EPDM). The different materials of the membrane 32 can be clearly distinguished from each other on the basis of the current courses I', I", I'". In this respect, it is also possible to deduce the type of membrane 32, in particular the material type, by evaluating the time course of the electrical variable, for example the current course. In this case, it can also be determined whether the correct diaphragm 32 has been installed in the corresponding valve 10.

Figure 7:
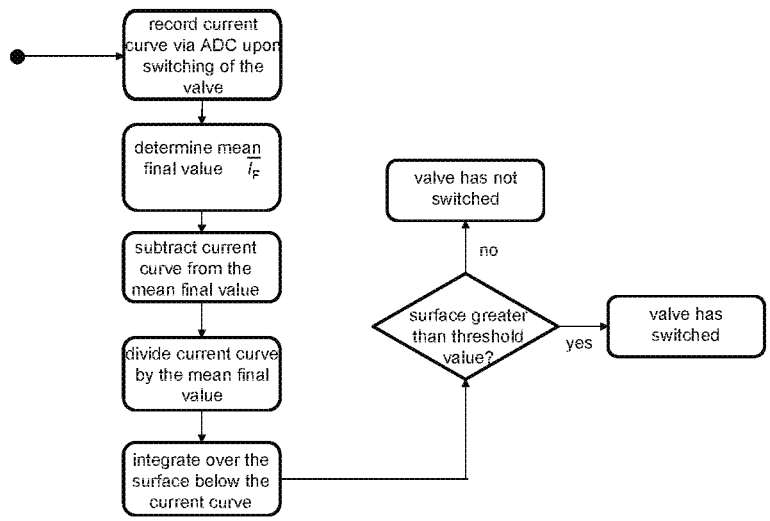
FIG. 7 shows a flow chart illustrating a method according to the present disclosure in accordance with a first variant embodiment.

FIG. 7 shows a flow chart illustrating the method of diagnosing the valve 10 according to a first variant embodiment.

First, the electrical variable of the electrodynamic actuator 24 is measured over a measurement period by the diagnosis module 40, in particular the measurement module 44, to sense a time course of the electrical variable. Accordingly, the values of the electrical variable may be stored in a digital format via an analog-to-digital converter (ADC).

The measured values of the electrical variable are stored, thus providing the current course, i.e., the time course of the electrical variable. The measurement period may be 200 milliseconds, the latter being selected such that the switching operation of the valve 10 is also completed at the end of the measurement period. The measurement period can be adapted or adjusted accordingly, depending on the ambient parameters, for example at low temperature or at high pressure of the medium.

Figure 8:
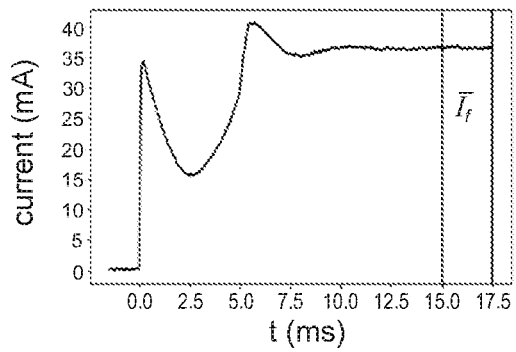
FIG. 8 shows a diagram showing a time course of an electrical variable measured according to the method according to FIG. 7.

FIG. 8 shows the second step of the method according to FIG. 7 in a detailed manner, in which the measured time course of the electrical variable is processed by the diagnosis module 40, in particular the computing module 46 to determine a mean final value $I_f$.

This may be the case when the measured value of the electrical variable does not change or changes only insignificantly over a predefined period of time, for example by less than a defined percentage value, in particular 5%. If this condition occurs, a point in time and an assigned final value of the electrical variable are fixed.

Figure 9:
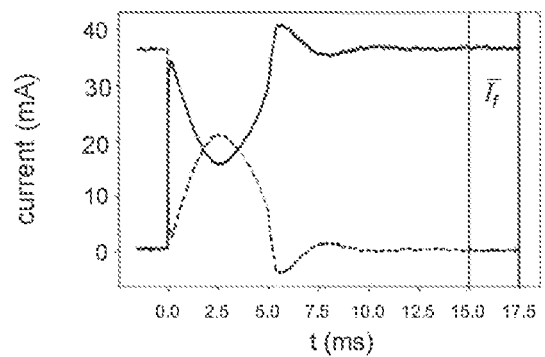
FIG. 9 shows a diagram showing the time course according to FIG. 8 and a modified time course based on the time course according to FIG. 8.

FIG. 9 shows the third step of the method according to FIG. 7 in a detailed manner, according to which the previously determined mean final value $I_f$ is respectively subtracted from the values of the measured electrical variable such that a modified time course of the electrical variable is generated which is additionally represented in a dashed form in FIG. 9.

Figure 10:
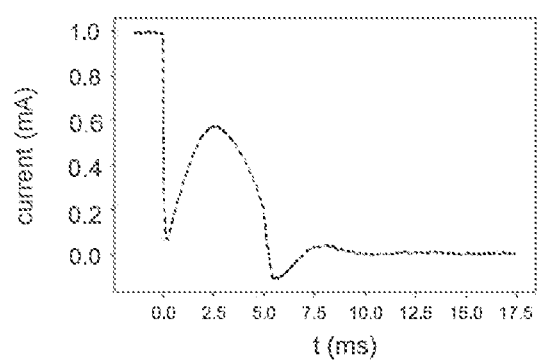
FIG. 10 shows a diagram showing a normalized time course of the electrical variable based on the modified time course according to FIG. 9.

The modified time course of the electrical variable is further processed in the computing module 46 of the diagnosis module 40 in that the corresponding current curve is divided by the previously determined mean final value I, such that a normalized time course of the electrical variable is present, as is clearly apparent from FIG. 10. The values resulting therefrom are independent of any resistance in the measurement setup.

It is then possible to determine the surface below the normalized curve by a corresponding integration thereof. The integral thus obtained is time-independent and independent of the resistance.

This allows the corresponding induction-dependent valve variable to be determined, namely the path of the coil 26 or the stroke of the valve 10.

If the calculated surface is greater than a predefined threshold value, it can be determined whether the valve 10 has switched or not. This corresponds to the valve parameter of the valve 10, which can be evaluated based on the previously determined valve variable.

Figure 11:
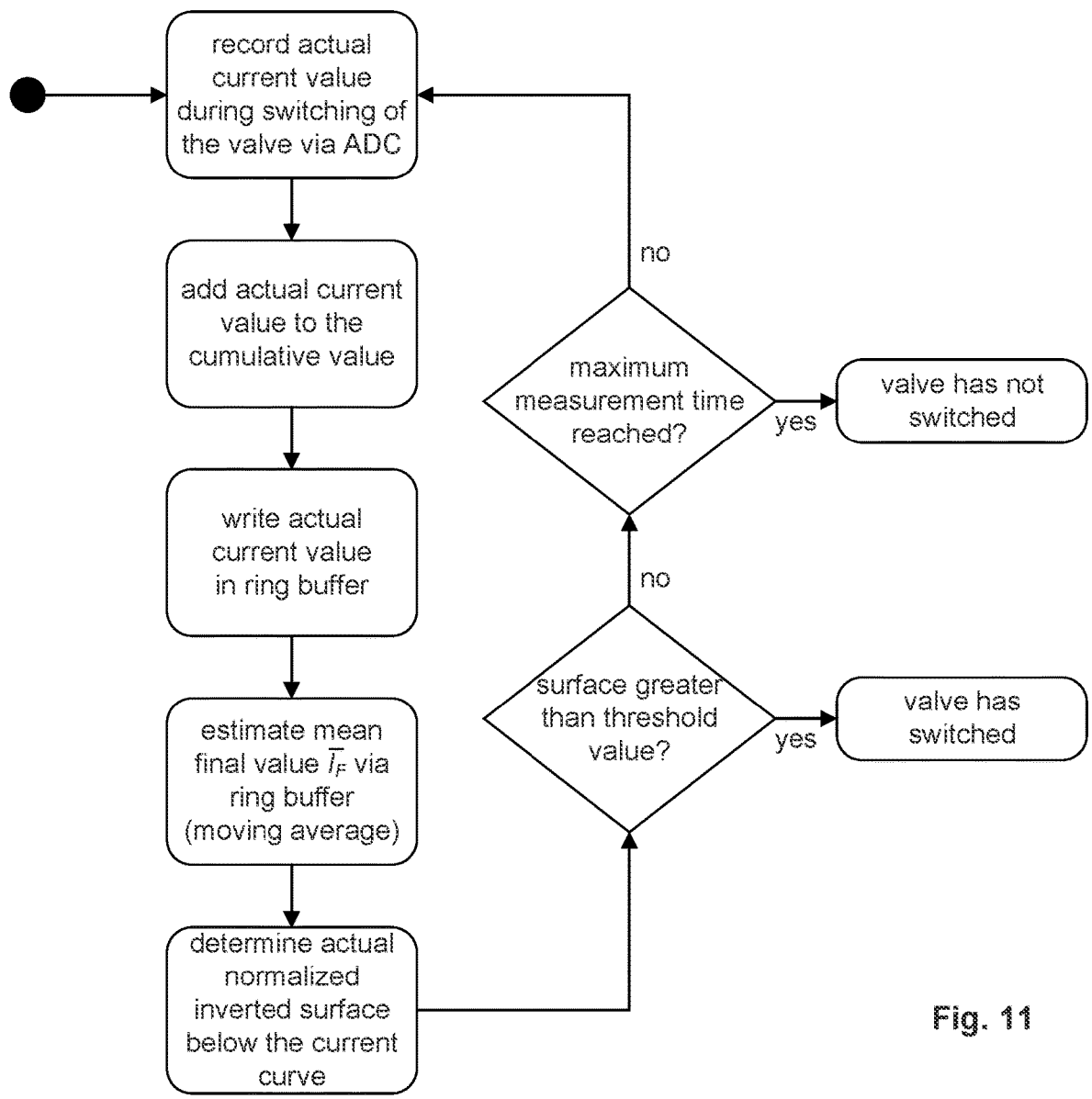
FIG. 11 shows a flow chart showing a method according to the present disclosure in accordance with a second variant embodiment.

FIG. 11 shows a second embodiment in which the evaluation of the time course of the electrical variable takes place during the movement of the coil 26, already after 15 milliseconds, for example.

It is thus possible to determine correspondingly more quickly whether a switching operation has taken place or not.

The electrical variable is measured over a measurement period, the measured values being summed up.

A corresponding cumulative value is calculated continuously and temporarily stored in a memory of the diagnosis module 40, in particular in a ring buffer.

The data stored in the ring buffer can be used to estimate the mean final value $I_f$ as a moving average, for example. It is thus possible to determine, in particular to estimate the mean final value $I_f$ still during the measurement of the electrical variable.

A calculation of the surface below the corresponding curve can then take place as previously described, the determined surface being in turn compared with the threshold value to determine the position of the valve 10.

The diagnosis module 40 may comprise artificial intelligence which is provided in the computing module 46, for example.

The artificial intelligence involves, for example, a machine learning model which has previously been trained appropriately to determine at least one valve parameter of the valve 10 on the basis of the valve variable.

In principle, the valve parameter may be a coil temperature, a valve temperature, a pressure ratio in the valve 10, a state of the diaphragm 32 actuated by the electrodynamic actuator 24, the type of diaphragm 32, a lifetime prediction of the diaphragm 32, a press-in depth of the diaphragm 32 into the assigned valve seat 34 and/or a correct fitting position of the diaphragm 32.

The diagnostic function can also be used for process monitoring. In a "stable process", first the reference course R is recorded. In the ongoing operation, corresponding time courses of the electrical variable can be measured and compared with the stored reference course R to thus detect changes. It is thus possible to monitor all influence factors affecting the course of the electrical variable.

It is additionally possible to determine very precise information as to the valve opening over time. In highly precise doser applications, the dosed quantity can thus be defined very accurately. This can be done in an absolute manner (in combination with other process values) or relative to previous dosing processes which thus serve as reference courses R.

It is furthermore possible to set up a closed control loop to allow a current curve to be traversed always in the same way and thus to keep the dosing quality stable in the long term, irrespective of any aging effects which may occur in the valve 10.

In this respect, it is possible according to the present disclosure to determine at least one induction-dependent valve variable which is assigned to the motion profile of the electrodynamic actuator 24 by evaluating the time course of the electrical variable of the electrodynamic actuator 24. Therefore, appropriate diagnostic functions of the valve 10 are possible in a simple and cost-effective manner, and are in particular retrofittable.

Certain embodiments disclosed herein, particularly the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A method of diagnosing a valve having an electrodynamic actuator, which comprises a magnet arrangement for generating a magnetic field and a control element which is movable relative to the magnet arrangement and coupled to a movably arranged coil which constitutes an electrical conductor that moves in the magnetic field, the method comprising the following steps:
measuring at least one electrical variable of the electrodynamic actuator over a measurement time period to detect a time course of the electrical variable, the time course including a plurality of measured values of the electrical variable over the measurement time period, and then
evaluating the time course of the at least one electrical variable over an evaluation time period, the evaluation time period corresponding to all or a portion of the measurement time period, to determine at least one induction-dependent valve variable via a corresponding time response of the electric variable, wherein the induction-dependent valve variable correlates to a motion profile of the electrodynamic actuator over the evaluation time period.

2. The method according to claim 1, wherein the electrical variable of the electrodynamic actuator is measured by means of a diagnosis module which is electrically inserted into an electric circuit of the coil of the electrodynamic actuator.

3. The method according to claim 1, wherein the at least one induction-dependent valve variable is at least one of a travelled path of the coil, a duration of movement of the coil, a speed profile of the coil, or an acceleration profile of the coil.

4. The method according to claim 1, wherein the step of evaluating the time course of the electrical variable over the evaluation time period includes comparing the time course to a time reference course of the electrical variable and determining the at least one induction-dependent valve variable based on at least one deviation between the time course and the time reference course.

5. The method according to claim 4, wherein the time course and the time reference course are plotted as lines on a graph and together enclose an area, wherein at least one of a surface area or a shape of the area is determined or analyzed to determine the at least one deviation.

6. The method according to claim 4, wherein the time reference course is a previously measured time course, a course calculated during the evaluating of the time course, or an approximately estimated course.

7. The method according to claim 4, wherein when the time reference course is indicative of values of the electrical variable when there is no movement of the electrodynamic actuator.

8. The method according to claim 1, wherein the at least one induction-dependent valve variable is evaluated to define at least one valve parameter of the valve.

9. The method according to claim 8, wherein the at least one valve parameter of the valve is at least one of a coil temperature, a valve temperature, pressure ratios in the valve, a state of a diaphragm actuated by the electrodynamic actuator, a type of diaphragm, a lifetime prediction of the diaphragm, a press-in depth of the diaphragm into an assigned valve seat, or a correct fitting position of the diaphragm.

10. The method according to claim 9, wherein artificial intelligence is used in the evaluation to define the at least one valve parameter of the valve.

11. The method according to claim 10, wherein a machine learning model is used in the evaluation to define the at least one valve parameter of the valve.

12. A diagnosis module for a valve having an electrodynamic actuator which comprises a magnet arrangement for generating a magnetic field and a control element which is movable relative to the magnet arrangement and is coupled to a movably arranged coil, wherein the diagnosis module is configured to perform the method according to claim 1.

13. A valve having a diaphragm, an electrodynamic actuator coupled to the diaphragm, and the diagnosis module according to claim 12.

14. The method according to claim 1, wherein the at least one induction-dependent valve variable correlates to a motion profile of the coil of the electrodynamic actuator over the evaluation time period.

* * * * *